(12) United States Patent
Eckel et al.

(10) Patent No.: US 7,319,116 B2
(45) Date of Patent: Jan. 15, 2008

(54) FLAME-RESISTANT POLYCARBONATE MOLDING COMPOSITION MODIFIED WITH A GRAFT POLYMER

(75) Inventors: Thomas Eckel, Dormagen (DE); Andreas Seidel, Dormagen (DE); Juan Gonzalez-Blanco, Köln (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 298 days.

(21) Appl. No.: 10/631,632

(22) Filed: Jul. 31, 2003

(65) Prior Publication Data

US 2004/0039091 A1 Feb. 26, 2004

(30) Foreign Application Priority Data

Aug. 5, 2002 (DE) .................. 102 35 754

(51) Int. Cl.
C08K 5/53 (2006.01)
C08K 5/523 (2006.01)

(52) U.S. Cl. ...................... 524/125; 524/127
(58) Field of Classification Search ................ 524/125, 524/127
See application file for complete search history.

(56) References Cited

U.S. PATENT DOCUMENTS

| | | | | |
|---|---|---|---|---|
| 5,204,394 A | 4/1993 | Gosens et al. | .............. | 524/125 |
| 5,514,772 A | 5/1996 | Suzuki et al. | ................ | 528/487 |
| 5,804,654 A * | 9/1998 | Lo et al. | ......................... | 525/67 |
| 5,961,915 A | 10/1999 | Toyouchi et al. | ........... | 264/572 |
| 6,083,428 A | 7/2000 | Ueda et al. | .................. | 252/609 |
| 6,180,702 B1 | 1/2001 | Chung et al. | ................ | 524/161 |
| 6,437,029 B1 * | 8/2002 | Lim et al. | ...................... | 524/97 |
| 2002/0091180 A1 | 7/2002 | Lim et al. | ....................... | 52/96 |
| 2005/0043469 A1* | 2/2005 | Horn et al. | .................. | 524/502 |

FOREIGN PATENT DOCUMENTS

| | | |
|---|---|---|
| CA | 2 368 188 | 10/2000 |
| EP | 1 201 714 | 5/2002 |
| EP | 771 851 | 5/2003 |
| EP | 767 204 | 6/2003 |
| JP | 59-202240 | 11/1984 |

* cited by examiner

Primary Examiner—Kriellion A Sanders
(74) Attorney, Agent, or Firm—Aron Preis

(57) ABSTRACT

A flame resistant thermoplastic molding composition having improved mechanical properties is disclosed. The composition contains polycarbonate, a graft polymer and a phosphorus compounds of formula (I):

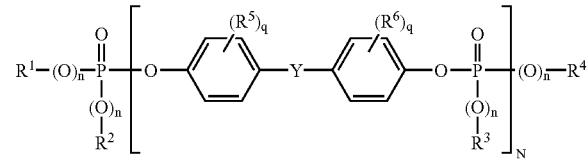

and a mixture of fluorinated polyolefins with polyalkyl (meth)acrylates.

12 Claims, No Drawings

FLAME-RESISTANT POLYCARBONATE MOLDING COMPOSITION MODIFIED WITH A GRAFT POLYMER

FIELD OF THE INVENTION

The invention relates to flame-resistant molding compositions and in particular to compositions that contain polycarbonate and a graft polymer.

SUMMARY OF THE INVENTION

A flame resistant thermoplastic molding composition having improved mechanical properties is disclosed. The composition contains polycarbonate, a graft polymer and a phosphorus compounds of formula (I):

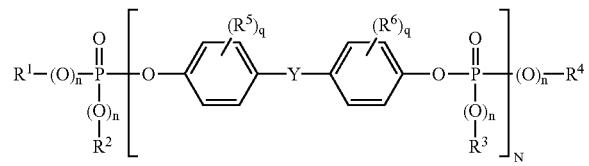

and a mixture of fluorinated polyolefins with polyalkyl (meth)acrylates.

BACKGROUND OF THE INVENTION

Diphosphates are known as flameproofing additives. JP 59 202 240 describes the preparation of such a product from phosphorus oxychloride, diphenols like hydroquinone or bisphenol A, and monophenols like phenol or cresol. These diphosphates may be used in polyamide or polycarbonate as flameproofing agents. However, the patent contains no indication of an improved stress cracking resistance due to the addition of the oligomeric phosphate to polycarbonate molding compositions.

EP-A 363 608 describes flame-resistant polymer mixtures of aromatic polycarbonate, styrene-containing copolymer or graft copolymer, and oligomeric phosphates as flameproofing agents. It is mentioned in general that tetrafluoroethylene polymers may be added.

EP-A 0 767 204 describes flame-resistant polyphenylene oxide (PPO) or poly-carbonate mixtures that contain a mixture of oligophosphates (bisphenol A (BPA) oligophosphate type) and monophosphates as flameproofing agents. High contents of flameproofing agents lead to disadvantageous mechanical properties (notched impact strength, stress cracking behavior) and a reduced dimensional stability under heat.

EP-A 0 611 798 and WO 96/27600 describe molding compounds containing polycarbonate and also oligomeric, terminally alkylated phosphoric acid esters of the BPA type. Because of the alkylation, the attainment of effective, flameproofing requires high proportions, which is very disadvantageous for many application engineering properties (mechanics, dimensional stability under heat).

EP-A 0 754 531 describes reinforced PC/ABS molding compounds suitable for precision parts. The flameproofing agents used are oligophosphates of the BPA type, inter alia. The high proportions of filler have a very disadvantageous effect on mechanical properties such as elongation at break or notched impact strength.

EP-A 771 851 describes molding compounds containing aromatic polycarbonate, graft polymer based on diene rubber, SAN copolymer, a phosphate and tetrafluoroethylene polymers, the polycarbonate having various molecular weights. Stability to loss of impact strength, heat stability and moisture resistance are disclosed as advantages.

To achieve an adequate level of flameproofing, the above-mentioned polymer mixtures usually require the presence of small proportions of PTFE as an antidripping agent. In the event of a fire, this prevents the polymer mixture from tending to produce burning drips and igniting materials situated underneath. In certain fire tests, e.g. the UL 94 V test, the avoidance of burning drips after ignition is assessed as particularly favorable and is stipulated as essential for achieving the best assessment, V-0.

U.S. Pat. No. 5,804,654 describes PTFE powders which are partially encapsulated with a styrene-containing polymer or copolymer and which are very suitable as additives V in polyester blends such as PC/ABS. U.S. Pat. No. 6,040,300 describes processes for the preparation of such special PTFE-containing powders.

The object of the present invention is to provide flameproof PC molding compositions modified with a graft polymer which are distinguished by very good mechanical properties, a high degree of fire resistance and a very good stress cracking behavior. In particular, these advantages are also observed at elevated processing temperatures. These molding compositions are thus particularly suitable for applications where contact with special media, e.g. solvent, lubricant, cleaning agent, etc., may occur.

DETAILED DESCRIPTION OF THE INVENTION

It has now been found that the compositions according to the invention exhibit the above-described advantages in terms of properties when the PTFE additive is used as a mixture with polyalkyl (meth)acrylates.

The invention therefore provides a thermoplastic molding compositions comprising polycarbonate, a graft polymer and a phosphorus compound of formula (I):

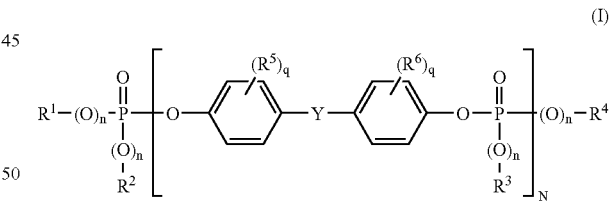

wherein
$R^1$, $R^2$, $R^3$ and $R^4$ independently of one another are optionally halogen-substituted $C_1$-$C_8$-alkyl or optionally halogen-substituted and/or alkyl-substituted $C_5$-$C_6$-cycloalkyl, $C_6$-$C_{10}$-aryl or $C_7$-$C_{12}$-aralkyl,
n independently of one another is 0 or 1,
q independently of one another is 0, 1, 2, 3 or 4,
N is 0 to 10, preferably 0.5 to 5 and particularly 0.9 to 3,
$R^5$ and $R^6$ independently of one another are $C_1$-$C_4$-alkyl, preferably methyl, or halogen, preferably chlorine or bromine, and;
Y is $C_1$-$C_7$-alkylidene, $C_1$-$C_7$-alkylene, $C_5$-$C_{12}$-cycloalkylene, $C_5$-$C_{12}$-cycloalkylidene, —O—, —S—, —SO—, —SO$_2$— or —CO—, and fluorinated polyolefins in the form of a mixture with polyalkyl (meth)acrylates.

The thermoplastic molding compositions contain preferably 0.5 to 20, particularly preferably 1 to 18 and particularly 2 to 16 parts by weight of phosphorus compound (I) or a mixture of phosphate compounds (I).

The thermoplastic molding compositions contain preferably 0.01 to 3, particularly 0.05 to 2 and very particularly preferably 0.1 to 0.8 parts by weight of fluorinated polyolefins in the form of special formulations with polyalkyl (meth)acrylates.

Preferred thermoplastic molding compositions are those containing

A) 40 to 99 and preferably 60 to 98.5 parts by weight of aromatic polycarbonate and/or polyestercarbonate, B) 0.5 to 60, preferably 1 to 40 and particularly 2 to 25 parts by weight of a graft polymer of B.1) 5 to 95 and preferably 30 to 80% relative to the weight of the graft polymer of one or more vinyl monomers to B.2) 95 to 5 and preferably 20 to 70% relative to the weight of the graft polymer of one or more graft bases having a glass transition temperature of <10° C., preferably of <0° C. and particularly preferably of <−20° C., C) 0 to 45, preferably 0 to 30 and particularly preferably 0 to 25 parts by weight of at least one thermoplastic polymer selected from the group comprising vinyl (co) polymers and polyalkylene terephthalates, D) 0.5 to 20 parts by weight, preferably 1 to 18 parts by weight and particularly preferably 2 to 16 parts by weight of a phosphorus compound of formula (I):

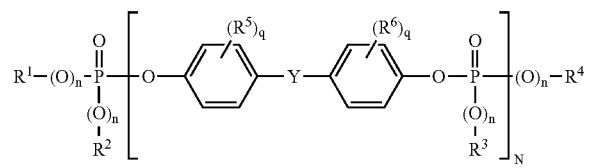

(I)

wherein $R^1$ to $R^6$, Y, n, N and q are as defined above, and

E) 0.01 to 3, preferably 0.05 to 2 and particularly preferably 0.1 to 0.8 parts by weight of fluorinated polyolefins in the form of a mixture with polyalkyl (meth)acrylates.

Component A

Aromatic polycarbonates and/or aromatic polyestercarbonates that are suitable according to the invention as the component A are known in the literature and may be prepared by processes known in the literature (for the preparation of aromatic polycarbonates see e.g. Schnell, "Chemistry and Physics of Polycarbonates", Interscience Publishers, 1964, and DE-AS 1 495 626, DE-OS 2 232 877, DE-OS 2 703 376, DE-OS 2 714 544, DE-OS 3 000 610 and DE-OS 3 832 396; for the preparation of aromatic polyestercarbonates see e.g. DE-OS 3 077934).

Aromatic polycarbonates are prepared e.g. by reacting diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents having a functionality of three or more, for example triphenols or tetraphenols.

Diphenols for the preparation of the aromatic polycarbonates and/or aromatic polyestercarbonates are preferably those of formula (III):

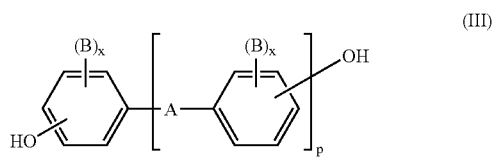

wherein

A is a single bond, $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene to which further aromatic rings optionally containing heteroatoms may be fused, or a radical of formula (IV) or (V):

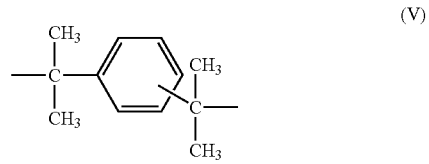

B are in each case $C_1$-$C_{12}$-alkyl, preferably methyl, or halogen, preferably chlorine and/or bromine, x independently of one another is 0, 1 or 2, p is 1 or 0, and $R^7$ and $R^8$ are individually selected for each $X^1$ and independently of one another are hydrogen or $C_1$-$C_6$-alkyl, preferably hydrogen, methyl or ethyl, $X^1$ is carbon, and m is an integer of 4 to 7, preferably 4 or 5, with the proviso that $R^7$ and $R^8$ are simultaneously alkyl on at least one atom $X^1$.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis-(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropyl-benzenes, and their ring-brominated and/or ring-chlorinated derivatives.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and their di- and tetrabrominated or chlorinated derivatives, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane.

2,2-Bis(4-hydroxyphenyl)propane (bisphenol A) is particularly preferred.

The diphenols may be used individually or as any desired mixtures.

The diphenols are known in the literature and may be obtained by known processes.

Examples of suitable chain terminators for the preparation of the thermoplastic aromatic polycarbonates are phenol, p-chlorophenol, p-tert-butylphenol or 2,4,6-tribromophenol, as well as long-chain alkylphenols; such as 4-(1,3-tetramethylbutyl)phenol according to DE-OS 2 842 005 (corresponding to U.S. Pat. No. 4,269,964 incorporated herein by reference), or monoalkylphenols or dialkylphenols having a total of 8 to 20 C atoms in the alkyl substituents, such as 3,5-di-tert-butylphenol, p-isooctylphenol, p-tert-octylphenol, p-dodecylphenol, 2-(3,5-dimethylheptyl)phenol and 4-(3,5-dimethylheptyl)phenol. The amount of chain terminators to be used is generally between 0.5 mol % and 10 mol %, based on the molar sum of the diphenols used.

The thermoplastic aromatic polycarbonates have weight-average molecular weights ($M_w$, measured e.g. by ultracentrifugation or light scattering) of 10,000 to 200,000 and preferably of 20,000 to 80,000.

The thermoplastic aromatic polycarbonates may be branched in known manner, preferably by the incorporation of 0.05 to 2.0 mol %, based on the sum of the diphenols used, of compounds having functionalities of three or more, for example those with three or more phenolic groups.

Both homopolycarbonates and copolycarbonates are suitable. Copolycarbonates according to the invention as component A may also be prepared using 1 to 25 wt. % and preferably 2.5 to 25 wt. % (based on the total amount of diphenols to be used) of polydiorganosiloxanes with hydroxyaryloxy end groups. These are known (cf. for example U.S. Pat. No. 3,419,634) or may be prepared by known processes. The preparation of copolycarbonates containing polydiorganosiloxanes is described e.g. in DE-OS 3 334 782 (U.S. Pat. No. 4,584,360 incorporated herein by reference).

Apart from bisphenol A homopolycarbonates, preferred polycarbonates are copolycarbonates of bisphenol A with up to 15 mol %, based on the molar sum of diphenols, of other diphenols mentioned as being preferred or particularly preferred, especially 2,2-bis(3,5-dibromo-4-hydroxyphenyl) propane.

Aromatic dicarbokylic acid dihalides for the preparation of aromatic polyester-carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used as a bifunctional acid derivative in the preparation of polyestercarbonates.

Suitable chain terminators for the preparation of the aromatic polyestercarbonates, apart from the monophenols already mentioned, are their chlorocarbonic acid esters and the acid chlorides of aromatic monocarboxylic acids which may optionally be substituted by $C_1$-$C_{22}$-alkyl groups or halogen atoms, as well as aliphatic $C_2$-$C_{22}$-monocarboxylic acid chlorides.

The amount of chain terminators is 0.1 to 10 mol % in each case, based on moles of diphenols for phenolic chain terminators and on moles of dicarboxylic acid dichlorides for monocarboxylic acid chloride chain terminators.

Aromatic hydroxycarboxylic acids may also be incorporated in the aromatic polyestercarbonates.

The aromatic polyestercarbonates may be both linear and branched in known manner (cf. also DE-OS 2 940 024 (U.S. Pat. No. 4,334,053) and DE-OS 3 007 934 incorporated herein by reference).

Examples of branching agents which may be used are trifunctional or more than trifunctional carboxylic acid chlorides, such as trimesic acid trichloride, cyanuric acid trichloride, benzophenone-3,3',4,4'-tetracarboxylic acid tetrachloride, naphthalene-1,4,5,8-tetracarboxylic acid tetrachloride or pyromellitic acid tetrachloride, in amounts of 0.01 to 1.0 mol % (based on the dicarboxylic acid dichlorides used), or trifunctional or more than trifunctional phenols, such as phloroglucinol, 4,6-dimethyl-2,4,6-tri(4-hydroxyphenyl)-2-heptene, 4,4-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl) propane, tetra(4-[4-hydroxy-phenylisopropyl]phenoxy) methane or 1,4-bis[4,4'-(dihydroxy-triphenyl)methyl] benzene, in amounts of 0.01 to 1.0 mol %, based on the diphenols used. Phenolic branching agents may be used with the diphenols, and acid chloride branching agents may be introduced together with the acid dichlorides.

The proportion of carbonate structural units in the thermoplastic aromatic *polyestercarbonates may vary freely. The proportion of carbonate groups is preferably up to 100 mol %, particularly up to 80 mol % and particularly preferably up to 50 mol %, based on the sum of the ester groups and carbonate groups. Both the ester part and the carbonate part of the aromatic polyestercarbonates may be present in the polycondensation product in the form of blocks or as a random distribution.

The relative solution viscosity ($\eta_{rel}$) of the aromatic polycarbonates and polyestercarbonates ranges from 1.18 to 1.4 and preferably from 1.22 to 1.3 (measured on solutions of 0.5 g of polycarbonate or polyestercarbonate in 100 ml of methylene chloride solution at 25° C.).

The thermoplastic aromatic polycarbonates and polyestercarbonates may be used on their own or in any desired mixture with one another.

Component B

The component B comprises one or more graft polymers of

B.1 5 to 95 and preferably 30 to 80 wt. % of at least one vinyl monomer to

B.2 95 to 5 and preferably 70 to 20 wt. % of one or-more graft bases with glass transition temperatures of <10° C., preferably of <0° C. and particularly preferably of <−20° C.

In general the graft base B.2 has a median particle size ($d_{50}$ value) of 0.05 to 5 µm, preferably of 0.10 to 0.5 µm and particularly preferably of 0.20 to 0.40 µm.

Monomers B.1 are preferably mixtures of

B.1.1 50 to 99 parts by weight of vinylaromatics and/or ring-substituted vinyl-aromatics (for example styrene, α-methylstyrene, p-methylstyrene, p-chlorostyrene) and/or $C_1$-$C_8$-alkyl (meth)acrylates (e.g. methyl methacrylate, ethyl methacrylate), and B.1.2 1 to 50 parts by weight of vinyl cyanides (unsaturated nitriles such as acrylonitrile and methacrylonitrile) and/or $C_1$-$C_8$-alkyl (meth)acrylates (e.g. methyl methacrylate, n-butyl acrylate, t-butyl acrylate) and/or derivatives (such as anhydrides and imides) of unsaturated carboxylic acids (for example maleic anhydride and N-phenylmaleimide).

Preferred monomers B.1.1 are at least one of the monomers styrene, α-methylstyrene and methyl methacrylate, and preferred monomers B.1.2 are at least one of the monomers acrylonitrile, maleic anhydride and methyl methacrylate.

Particularly preferred monomers B.1.1 and B.1.2 are styrene and acrylonitrile respectively.

Examples of suitable graft bases B.2 for the graft polymers B are diene rubbers, EP(D)M rubbers, i.e. those based on ethylene/propylene and optionally diene, and acrylate, polyurethane, silicone, chloroprene and ethylene/vinyl acetate rubbers.

Preferred graft bases B.2 are diene rubbers (e.g. those based on butadiene, isoprene, etc.), or mixtures of diene rubbers, or copolymers of diene rubbers or mixtures thereof with other copolymerizable monomers (e.g. according to B.1.1 and B.1.2), preferably butadiene/styrene copolymers, with the proviso that the glass transition temperature of the component B.2 is <10° C., preferably <0° C. and particularly preferably <−10° C.

Pure polybutadiene rubber is particularly preferred.

Examples of particularly preferred polymers B are ABS polymers (emulsion, bulk or suspension ABS) such as those described e.g. in DE-OS 2 035 390 (=U.S. Pat. No. 3,644, 574), in DE-OS 2 248 242 (=GB-PS 1 409 275) or in Ullmann, Enzyklopädie der Technischen Chemie, vol. 19 (1980), p. 280 et seq. The gel content of the graft base B.2 is at least 30 wt. % and preferably at least 40 wt. % (measured in toluene).

The graft copolymers B are prepared by free-radical polymerization, e.g. by emulsion, suspension, solution or bulk polymerization, preferably by emulsion polymerization or bulk polymerization.

Other particularly suitable graft rubbers are ABS polymers prepared by redox initiation with an initiator system consisting of organic hydroperoxide and ascorbic acid according to U.S. Pat. No. 4,937,285.

It is known that the graft monomers are not necessarily completely grafted onto the graft base in the grafting reaction, so graft polymers B are also understood according to the invention as meaning products which are obtained by (co)polymerization of the graft monomers in the presence of the graft base and appear therewith in the work-up.

Suitable acrylate rubbers B.2 of the polymers B are preferably polymers of alkyl acrylates, optionally with up to 40 wt. %, based on B.2, of other polymerizable, ethylenically unsaturated monomers. The preferred polymerizable acrylic acid esters include $C_1$-$C_8$-alkyl esters, for example methyl, ethyl, butyl, n-octyl and 2-ethylhexyl esters; halogenoalkyl esters, preferably halogeno-$C_1$-$C_8$alkyl esters such as chloroethyl acrylate; and mixtures of these monomers.

Monomers having more than one polymerizable double bond may be copolymerized for the purpose of crosslinking. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, e.g. ethylene glycol dimethacrylate and allyl methacrylate; polyunsaturated heterocyclic compounds, e.g. trivinyl and triallyl cyanurate; polyfunctional vinyl compounds such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylhexahydro-s-triazine and triallylbenzenes. The amount of crosslinked monomers is preferably 0.02 to 5 and particularly 0.05 to 2 wt. %, based on the graft base B.2.

In the case of cyclic crosslinking monomers having at least 3 ethylenically unsaturated groups, it is advantageous to restrict their amount to below 1 wt. % of the graft base B.2.

Preferred examples of "other" polymerizable, ethylenically unsaturated monomers that may optionally be used, apart from the acrylic acid esters, for the preparation of the graft base B.2 are acrylonitrile, styrene, α-methylstyrene, acrylamides, vinyl $C_1$-$C_6$-alkyl ethers, methyl methacrylate and butadiene. Preferred acrylate rubbers as the graft base B.2 are emulsion polymers having a gel content of at least 60 wt. %.

Other suitable graft bases B.2 are silicone rubbers with graft-active sites, such as those described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer; R. Kuhn, Polymeranalytik I und II, Georg Thieme-Verlag, Stuttgart 1977).

The median particle size $d_{50}$ is the diameter above which 50 wt. % of the particles fall and below which 50 wt. % of the particles fall. It may be measured by ultracentrifugation (W. Scholtan, H. Lange, Kolloid, Z. und Z. Polymere 250 (1972), 782-1796).

Component C

The component C comprises one or more thermoplastic vinyl (co)polymers C.1 and/or polyalkylene terephthalates C.2.

Suitable vinyl (co)polymers C.1 are polymers of at least one monomer selected from the group consisting of vinylaromatics, vinyl cyanides (unsaturated nitriles), $C_1$-$C_8$-alkyl (meth)acrylates, unsaturated carboxylic acids and derivatives (such as anhydrides and imides) of unsaturated carboxylic acids. Particularly suitable (co)polymers are those containing C.1.1 50 to 99 and preferably 60 to 80 parts by weight of vinylaromatics and/or ring-substituted vinylaromatics (for example styrene, α-methylstyrene, p-methylstyrene, p-chlorostyrene) and/or $C_1$-$C_8$-alkyl (meth)acrylates (e.g. methyl methacrylate, ethyl methacrylate), and C.1.2 1 to 50 and preferably 20 to 40 parts by weight of vinyl cyanides (unsaturated nitriles) (such as acrylonitrile and methacrylonitrile) and/or $C_1$-$C_8$-alkyl (meth)acrylates (e.g. methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resinous, thermoplastic and rubber-free.

The copolymer of styrene as C.1.1 and acrylonitrile as C.1.2 is particularly preferred.

The (co)polymers C.1 are known and may be prepared by free-radical polymerization, especially by emulsion, suspension, solution or bulk polymerization. The (co)polymers preferably have molecular weights $M_w$ (weight-average, determined by light scattering or sedimentation) of between 15,000 and 200,000.

The polyalkylene terephthalates of the component C.2 are products resulting from the reaction of aromatic dicarboxylic acids or their reactive derivatives, such as dimethyl esters or anhydrides, with aliphatic, cycloaliphatic or araliphatic diols, and mixtures of these reaction products.

Preferred polyalkylene terephthalates contain at least 80 wt. % and preferably at least 90 wt. %, based on the dicarboxylic acid component, of terephthalic acid radicals and at least 80 wt. % and preferably at least 90 mol %, based on the diol component, of ethylene glycol and/or 1,4-butanediol radicals.

Apart from terephthalic acid radicals, the preferred polyalkylene terephthalates may contain up to 20 mol % and preferably up to 10 mol % of radicals of other aromatic or cycloaliphatic dicarboxylic acids having 8 to 14 C atoms or of aliphatic dicarboxylic acids having 4 to 12 C atoms, e.g. radicals of phthalic acid, isophthalic acid, naphthalene-2,6-dicarboxylic acid, biphenyl-4,4'-dicarboxylic acid, succinic acid, adipic acid, sebacic acid, azelaic acid and cyclohexanediacetic acid.

Apart from ethylene glycol or 1,4-butanediol radicals, the preferred polyalkylene terephthalates may contain up to 20 mol % and preferably up to 10 mol % of other aliphatic diols having 3 to 12 C atoms or cycloaliphatic diols having 6 to 21 C atoms, e.g. radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl)propane and 2,2-bis(4-hydroxypropoxyphenyl)propane (DE-OS 2 407 674, 2 404 776, 2 715 932).

The polyalkylene terephthalates may be branched by the incorporation of relatively small amounts of trihydric or tetrahydric alcohols or tribasic or tetrabasic carboxylic acids, e.g. according to DE-OS 1 900 270 and U.S. Pat. No. 3,692,744. Examples of preferred branching agents are trimesic acid, trimellitic acid, trimethylolethane, trimethylolpropane and pentaerythritol.

Particularly preferred polyalkylene terephthalates are those prepared only from terephthalic acid and its reactive derivatives (e.g. its dialkyl esters) and ethylene glycol and/or 1,4-butanediol, and mixtures of these polyalkylene terephthalates.

Mixtures of polyalkylene terephthalates contain 1 to 50 wt. % and preferably 1 to 30 wt. % of polyethylene terephthalate and 50 to 99 wt. % and preferably 70 to 99 wt. % of polybutylene terephthalate.

The polyalkylene terephthalates that are preferably used generally have an intrinsic viscosity of 0.4 to 1.5 dl/g and preferably of 0.5 to 1.2 dl/g, measured in phenol/o-dichlorobenzene (1:1 parts by weight) at 25° C. in an Ubbelohde viscometer.

The polyalkylene terephthalates may be prepared by known methods (cf. for example Kunststoff-Handbuch, volume VIII, p. 695 et seq., Carl-Hanser-Verlag, Munich 1973).

Component D

The molding compositions according to the invention contain, as flameproofing agents, phosphorus compounds of formula (I):

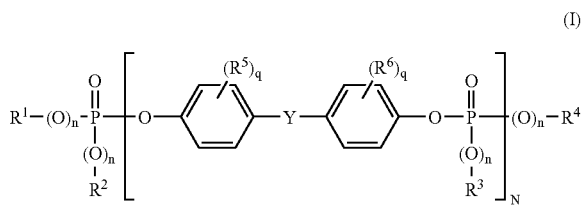

in which the radicals are as defined above.

The phosphorus compounds of the component D that are suitable according to the invention are generally known (cf. for example Ullmanns Encyklopädie der Technischen Chemie, vol. 18, p. 301 et seq., 1979; Houben-Weyl, Methoden der Organischen Chemie, vol. 12/1, p. 43; Beilstein, vol. 6, p. 177).

Preferred substituents $R^1$ to $R^4$ include methyl, butyl, octyl, chloroethyl, 2-chloro-propyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ may be substituted by halogen and/or $C_1$-$C_4$-alkyl. Particularly preferred aryl radicals are cresyl, phenyl, xylenyl, propylphenyl or butylphenyl, as well as the brominated and chlorinated derivatives thereof.

$R^5$ and $R^6$ independently of one another are preferably methyl or bromine.

Y is preferably $C_1$-$C_7$-alkylene and particularly isopropylidene or methylene.

n in formula (I) independently of one another may be 0 or 1 and are preferably 1.

q may be 0, 1, 2, 3 or 4, preferably 0, 1 or 2 and particularly preferably 0.

N may by 0 to 10, preferably of 0.5 to 5 and particularly 0.9 to 3. Mixtures of different phosphates may also be used as the component D according to the invention. In this case N has an average value. This mixture may also contain monophosphorus compounds (N=0).

The mean values of N may be determined by using a suitable method [gas chromatography (GC), high pressure liquid chromatography (HPLC), gas permeation chromatography (GPC)] to determine the composition (molecular weight distribution) of the phosphate mixture and calculating the mean values of N from this.

Component E

Fluorinated polyolefins are added as a further component.

The fluorinated polyolefins E are high-molecular and have glass transition temperatures above −30° C. and normally above 100° C., fluorine contents preferably of 65 to 76 and particularly of 70 to 76 wt. % and median particle diameters ($d_{50}$) of 0.05 to 1000 and preferably of 0.08 to 20 μm. The fluorinated polyolefins E generally have a density of 1.2 to 2.3 g/cm³. Preferred fluorinated polyolefins E are polytetrafluoroethylene, polyvinylidene fluoride and tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484-494; "Fluoropolymers" by Wall, Wiley-Interscience, John Wiley & Sons, Inc., New York, volume 13, 1970, pages 623-654; "Modern Plastics Encyclopedia", 1970-1971, volume 47, no. 10 A, October 1970, McGraw-Hill, Inc., New York, pages 134 and 774; "Modem Plastics Encyclopedia", 1975-1976, October 1975, volume 52, no. 10 A, McGraw-Hill, Inc., New York, pages 27, 28 and 472; and U.S. Pat. Nos. 3,671,487, 3,723, 373 and 3,838,092).

They may be prepared by known processes, for example by the polymerization of tetrafluoroethylene in an aqueous medium with a catalyst that forms free radicals, for example sodium, potassium or ammonium peroxydisulfate, at pressures of 7 to 71 kg/cm$^2$ and at temperatures of 0 to 200° C. and preferably of 20 to 100° C. (For further details see e.g. U.S. Pat. No. 2,393,967.) Depending on the form in which they are used, the density of these materials may be between 1.2 and 2.3 g/cm$^3$ and the mean particle size may be between 0.5 and 1000 μm.

Fluorinated polyolefins E which are preferred according to the invention are used in the form of an emulsion with a median particle diameter of 0.05 to 20 μm and preferably of 0.08 to 10 μm and a density of 1.2 to 1.9 g/cm$^3$, or in the form of a powder with a median particle diameter of 100 to 1000 μm and densities of 2.0 g/cm$^3$ to 2.3 g/cm$^3$.

According to the invention, the fluorinated polyolefins E are preferably used in the form of a mixture with polyalkyl (meth)acrylates.

According to the invention, the mixtures of fluorinated polyolefin and polyalkyl (meth)acrylates, preferably poly-$C_1$-$C_8$-alkyl (meth)acrylates, may be obtained in the following ways:

1) as a coagulated mixture of an emulsion of poly-$C_1$-$C_8$-alkyl (meth)acrylates with an emulsion of the fluorinated polyolefin. Special embodiments are also suitable here, for example polymerization of the polyalkyl (meth)acrylate in the presence of an emulsion of the fluorinated polyolefin, followed by joint precipitation.
2) as a master batch of a fluorinated polyolefin and a polyalkyl (meth)acrylate, the components being compounded in the melt, generally at temperatures of 200° C. to 330° C., in the conventional mechanical units such as internal kneaders, extruders or double-shaft screws.

In terms of the present invention, polyalkyl (meth)acrylates are preferably synthesized from at least one monomer selected from $C_1$-$C_8$-alkyl methacrylates, preferably $C_1$-$C_4$-alkyl methacrylates and particularly methyl methacrylate, and $C_1$-$C_8$-alkyl acrylates, preferably $C_1$-$C_4$-alkyl acrylates and particularly ethyl acrylate. Polyalkyl (meth)acrylate may take the form of a homopolymer or a copolymer. Copolymers preferably contain methyl methacrylate and up to approx. 30 wt. % and preferably 3 to 30 wt. % of one or more $C_1$-$C_4$-alkyl acrylates as comonomers.

Polymethyl methacrylate is particularly preferred. The polyalkyl (meth)acrylates are known (e.g. U.S. Pat. No. 5,292,786).

In the mixture the ratio of polyalkyl (meth)acrylate to fluorinated polyolefin E is 95:5 to 5:95 and preferably 90:10 to 40:60. The emulsion mixture is then coagulated in known manner, for example by spray drying, freeze drying or coagulation by the addition of inorganic or organic salts, acids or bases or organic water-miscible solvents such as alcohols or ketones, at temperatures preferably of 20 to 150° C. and particularly of 50 to 100° C. If necessary, the ingredients may be dried at 50 to 200° C. and preferably at 70 to 100° C.

Suitable tetrafluoroethylene polymer emulsions are commercially available products and are sold for example by DuPont (Wilmington, Del., USA) as Teflon® 30 N or by Dyneon GmbH (Burgkichen, Germany) as Hostaflon®.

Suitable fluorinated polyolefin powders are commercially available products and are sold for example by DuPont as Teflon® CFP 6000 N or by Dyneon GmbH (Burgkichen, Germany) as Hostaflon® TF 2071.

Component F

The molding compositions according to the invention may contain at least one of the conventional additives, such as lubricants and mold-release agents, for example pentaerythritol tetrastearate, nucleating agents, antistatic agents, stabilizers, fillers and reinforcing agents, as well as dyes and pigments.

The filled or reinforced molding compositions may contain up to 60 and preferably 1 to 40 wt. %, based on the filled or reinforced molding composition, of fillers and/or reinforcing agents. Preferred reinforcing agents are glass fibres. Preferred fillers, which may also have a reinforcing effect, are glass spheres, mica, silicates, quartz, talcum, titanium dioxide and wollastonite.

Preferred fillers and reinforcing agents are very finely divided mineral particles with an anisotropic particle geometry.

Mineral particles with an anisotropic particle geometry are understood as meaning particles whose aspect ratio—the ratio of the largest to the smallest particle dimension—is greater than 1, preferably greater than 2 and particularly preferably greater than about 5. Such particles are platelet-like or fibrous, at least in the broadest sense. Such materials include e.g. certain talcums and certain (alumino)-silicates with a sheet or fiber geometry, such as bentonite, wollastonite, mica, kaolin, hydrotalcite, hectorite or montmorillonite.

Preferably, it is also possible to use inorganic materials of scale-like or platelet-like character, such as talcum, mica/clay sheet minerals, montmorillonite (the latter also in an organophilic form modified by ion exchange), kaolin and vermiculite.

Furthermore, the mineral particles may be surface-modified, for example silanized, with organic molecules in order to improve compatibility with the polymers. Hydrophobic or hydrophilic surfaces may be produced in this way.

The molding compositions according to the invention may contain up to 35 wt. %, based on the total molding composition, of another flameproofing agent optionally having a synergistic action. Examples of other flameproofing agents which may be mentioned are organic halogen compounds such as decabromodiphenyl ether and tetrabromobisphenol, inorganic halogen compounds such as ammonium bromide, nitrogen compounds such as melamine and melamine/formaldehyde resins, inorganic hydroxide compounds such as Mg and Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, talcum, silicate, silicon oxide and tin oxide, as well as siloxane compounds. Other flameproofing agents which may also be used are monophosphate compounds, oligomeric phosphate compounds or mixtures thereof. Such phosphorus compounds are described in EP-A 363 608, EP-A 345 522 and DE-OS 197 21 628.

The parts by weight in the present patent application are standardized so that the sum of the parts by weight of the components A to F in the composition is 100.

The molding compositions according to the invention, containing the components A to E and optionally other known additives such as stabilizers, dyes, pigments, lubricants and demolding agents, nucleating agents and antistatic agents, fillers and reinforcing agents, are prepared by mixing the appropriate constituents in known manner and compounding and extruding the mixture in the melt at temperatures of 200° C. to 300° C. in conventional mechanical units such as internal kneaders, extruders and double-shaft screws.

The individual constituents may be mixed in known manner, either successively or simultaneously and either at about 20° C. (room temperature) or at elevated temperatures.

The invention therefore also provides a process for the preparation of the molding compositions.

The molding compositions of the present invention may be used for the production of all kinds of molded articles. molded articles may be produced in particular by injection molding. Examples of molded articles which may be produced are all kinds of housing parts, e.g. for home appliances such as juice presses, coffee machines and mixers, or for office machines such as monitors, printers and copiers, or cover plates for the building sector and parts for the motor vehicle sector. They may also be used in the field of electrotechnology because they have very good electrical properties.

The molding compositions according to the invention may also be used for example for the production of the following molded articles or molded parts:
interior trim for rail vehicles, hub caps, housings for electrical equipment containing small transformers, housings for equipment for the dissemination and communication of information, housings and clothing for medical purposes, massage equipment and its housings, children's toy vehicles, wall panels, housings for safety devices, rear spoilers, thermally insulated transport containers, devices for keeping or caring for small animals, molded parts for sanitary and bath fittings, covering grids for ventilation apertures, molded parts for summer houses and garden sheds, and housings for garden tools.

Another form of processing is the production of molded articles by deep drawing from previously produced slabs or sheets.

The present invention therefore also provides the use of the molding compositions according to the invention for the production of all kinds of molded articles, preferably those mentioned above, and the molded articles made from the molding compositions according to the invention.

EXAMPLES

Component A1
Homopolycarbonate based on bisphenol A with a relative solution viscosity of 1.280, measured in methylene chloride at 25° C. and at a concentration of 0.5 g/100 ml.

Component A2
Homopolycarbonate based on bisphenol A with a relative solution viscosity of 1.255, measured in methylene chloride at 25° C. and at a concentration of 0.5 g/100 ml.

Component B
Graft polymer of 40 parts by weight of styrene and acrylonitrile in a ratio of 73:27 grafted onto 60 parts by weight of particulate crosslinked polybutadiene rubber (median particle diameter $d_{50}$=0.33 µm), prepared by emulsion polymerization.

Component C
Styrene/acrylonitrile copolymer with a styrene/acrylonitrile ratio of 72:28 and an intrinsic viscosity of 0.55 dl/g (measured in dimethylformamide at 20° C.).

Component D1
A mixture of BDP and TPP in a weight ratio of 75:25.
a) Bisphenol diphosphate (BDP):

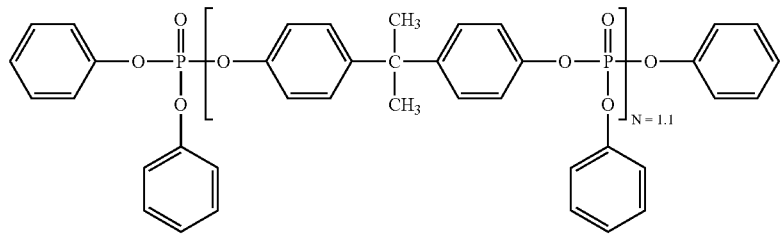

The mean value of N is determined by first using HPLC to measure the proportions of the monomeric and oligomeric phosphates:

| Column type: | LiChrosorb RP-8 |
| --- | --- |
| Eluents in gradient: | acetonitrile/water 50:50 to 100:0 |
| Concentration: | 5 mg/ml |

The number-weighted means are then calculated by known methods from the proportions of the individual components (monophosphates and oligophosphates).
b) Triphenyl phosphate (TPP): Disflamoll® TP, Bayer AG, Leverkusen, Germany Component D2
BDP of component D1 a)

Component E

E.1
Coagulated mixture of 50 parts by weight of SAN copolymer and 50 parts by weight of PTFE; Blendex 449, General Electric Plastics.

E.2
Coagulated mixture of 50 parts by weight of polymethyl methacrylate and 50 parts by weight of PTFE; Metablen A-3800, Mitsubishi Rayon.

E.3
Coagulated mixture of 90 parts by weight of graft polymer (consisting of 40 parts by weight of styrene and acrylonitrile in a ratio of 73:27 to 60 parts by weight of particulate crosslinked polybutadiene rubber with a median particle diameter $d_{50}$ of 0.33 μm) and 10 parts by weight of polytetrafluoroethylene polymer (Teflon® 30 N, DuPont, Wilmington, Del., USA).

Component F

HTP Ultra 5 talcum from HiTak.

Preparation and Testing of the Molding Compositions According to the Invention

The components are mixed with the conventional processing aids on a ZSK 25 twin-screw extruder. The molded articles are produced on an Arburg 270E injection molding machine at 240° C. or 280° C.

The weld strength is determined at room temperature by the ISO 179 1 eU method on 80×10×4 mm bars injection-molded from both sides.

The Vicat B dimensional stability under heat is determined according to DIN 53 460 on 80×10×4 mm bars.

The modulus of elasticity and elongation at break are determined according to ISO 527/DIN 53 457.

The flammability of the specimens was measured according to UL-Subj. 94 V on 127×12.7×1.6 mm bars produced on an injection molding machine at 260° C.

The UL 94 V test is carried out as follows:

Specimens of substance are shaped to 127×12.7×1.6 mm bars. The bars are mounted vertically so that the underside of the test piece is located 305 mm above a strip of surgical dressing. Each test bar is ignited individually by means of two consecutive ignition processes lasting 10 seconds, the burning properties are observed after each ignition process and the specimen is then assessed. The specimen is ignited using a Bunsen burner with a 10 mm (3.8 inch) high blue flame of natural gas with a calorific value of $3.73 \times 10^4$ kJ/m³ (1000 BTU per cubic foot).

The UL 94 V-0 classification includes the material properties described below, tested according to UL 94 V instructions. The specimens of molding compositions in this class may not burn for longer than 10 seconds after each application of the test flame; the total flaming combustion time may not exceed 50 seconds for the two flame applications for each set of specimens; the specimens may not burn away completely up to the holding clamp fixed to the upper end of the specimen; the specimens may not produce flaming drips or particles that ignite the surgical cotton located below the specimen; the specimens may not exhibit glowing combustion that persists for more than 30 seconds after removal of the test flame.

Other UL 94 classifications denote specimens which are less flame-resistant or less self-extinguishing because they produce flaming drips or particles. These classifications are designated by UL 94 V-1 and V-2. F stands for "failed" and is the classification for specimens which exhibit an afterglow time of ≧30 seconds.

The stress cracking behavior (ESC behavior) is examined on 80×10×4 mm bars injection-molded at a temperature of 260° C. The test medium used is a mixture of 60 vol. % of toluene and 40 vol. % of isopropanol. The test pieces are pre-extended by means of a circular arc template (pre-extension $\epsilon_x$ in percent) and stored in the test medium at room temperature. The stress cracking behavior is assessed via the cracking or rupture as a function of the pre-extension in the test medium.

TABLE 1

Composition and properties of the molding compositions Based on the total composition, the PTFE content in Examples 1 to 4 is the same at 0.4 wt. % of PTFE.

| | 1 (Comp.) | 2 | 3 (Comp.) | 4 |
|---|---|---|---|---|
| Component (parts by weight) | | | | |
| A1 (PC) | 68.3 | 68.3 | — | — |
| A2 (PC) | — | — | 70.0 | 70.0 |
| B (ABS) | 9.8 | 9.8 | 5.0 | 8.6 |
| C (SAN) | 7.1 | 7.1 | 5.0 | 4.6 |
| D1 (BDP/TPP) | 14.5 | 14.5 | — | — |
| D2 (BDP) | — | — | 12.5 | 12.5 |
| E1 (SAN/PTFE) | 0.8 | — | — | — |
| E2 (PMMA/PTFE) | — | 0.8 | — | 0.8 |
| E3 (ABS/PTFE) | — | — | 4.0 | — |
| F (talcum) | — | — | 3.0 | 3.0 |
| mold release agent | 0.4 | 0.4 | 0.4 | 0.4 |
| Property | | | | |
| Vicat B 120 [° C.] | 95 | 95 | 102 | 103 |
| UL 94 V, 3.0 mm | V-0 | V-0 | — | — |
| afterglow time [s] | 15 | 9 | — | — |
| UL 94 V, 1.5 mm | V-0 | V-0 | — | — |
| afterglow time [s] | 39 | 29 | — | — |
| UL 94 V, 1.2 mm | — | — | V-1 | V-0 |
| afterglow time [s] | — | — | 103 | 36 |
| UL 94 V, 1.0 mm | — | — | F | V-0 |
| afterglow time [s] | — | — | 152 | 34 |
| ESC behavior rupture at $\epsilon_x$ [%] | 1.8 | 2.0 | 2.0 | 2.4 |
| Modulus of elasticity [N/mm²] | — | — | 2861 | 2978 |
| Elongation at break [%] | — | — | 33 | 49 |
| $a_n$F weld strength[1] [kJ/m²] | 8.8 | 9.6 | 7.2 | 7.7 |

[1]test bars injection-molded at 280° C.
F = failed

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
A) 40 to 99 parts by weight of aromatic polycarbonate and/or polyester-carbonate,
B) 0.5 to 60 parts by weight of graft polymer consisting of
B.1) 5 to 95 wt. % of the polymerization product of one or more vinyl monomers grafted to
B.2) 95 to 5 wt. % of one or more graft bases having glass transition temperature of <10° C.,
C) 0 to 45 parts by weight of at least one thermoplastic polymer selected from the group consisting of vinyl (co)polymers and polyalkylene terephthalates,
D) 0.5 to 20 parts by weight of a phosphorus compound of formula (I):

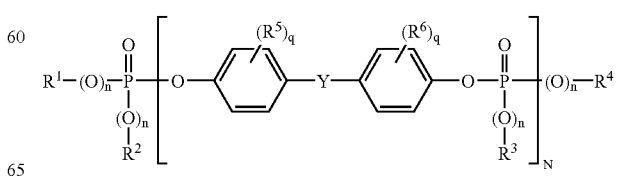

wherein

R$^1$, R$^2$, R$^3$ and R$^4$ independently of one another denote an optionally halogen-substituted C$_1$-C$_8$-alkyl or optionally halogen-substituted and/or alkyl-substituted C$_5$-C$_6$-cycloalkyl, C$_6$-C$_{10}$-aryl or C$_7$-C$_{12}$-aralkyl, n independently of one another denotes 0 or 1, q independently of one another denotes 0, 1, 2, 3 or 4, N is 0 to 10, R$^5$ and R$^6$ independently of one another are C$_1$-C$_4$-alkyl or halogen, and Y is C$_1$-C$_7$-alkylidene, C$_1$-C$_7$-alkylene, C$_5$-C$_{12}$-cycloalkylene, C$_5$-C$_{12}$-cycloalkylidene, —O—, —S—, —SO—, —SO$_2$— or —CO—, and E) 0.01 to 3 parts by weight of a mixture of fluorinated polyolefin with polyalkyl (meth)acrylate selected from the group consisting of homopolymer of C$_{1-8}$-alkyl methacrylate homopolymer of C$_{1-8}$-alkylacrylate and copolymer of C$_{1-8}$-alkyl methacrylate and C$_{1-8}$-alkyl acrylate.

2. The molding composition according to claim 1 wherein the mixture of fluorinated polyolefin with polyalkyl (meth)acrylate is a member selected from the group consisting of
1) a coagulated mixture of an emulsion of polyalkyl (meth)acrylates with an emulsion of the fluorinated polyolefin and
2) a preliminary compound of a fluorinated polyolefin and a polyalkyl (meth)acrylate.

3. The molding composition according to claim 1 wherein the mixture of fluorinated polyolef in with polyalkyl(meth)acrylate is present in an amount of 0.05 to 2 percent relative to the weight of the composition.

4. The molding composition according to claim 1 wherein N in formula (I) is 0.5 to 5.

5. The molding composition according to claim 1 wherein N in formula (I) is 0.9 to 3.

6. The molding composition according to claim 1 where B.1 is the polymerization product of a mixture of
B.1.1 50 to 99 parts by weight of at least one member selected from the group consisting of vinylaromatics, ring-substituted vinylaromatics and C$_1$-C$_8$-alkyl (meth) acrylates, and
B.1.2 1 to 50 parts by weight of at least one member selected from the group consisting of vinyl cyanides, C$_1$-C$_8$-alkyl (meth)acrylates and derivatives of unsaturated carboxylic acids.

7. The molding composition according to claim 1 wherein graft base B.2 is at least one member selected from the group consisting of diene rubber, acrylate rubber, silicone rubber and ethylene/propylene/diene rubber.

8. The molding composition according to claim 1 wherein Y in formula (I) is isopropylidene or methylene.

9. The molding composition according to claim 8 wherein Y in formula (I) is isopropylidene.

10. The molding composition according to claim 1 wherein vinyl (co)polymer is the polymerization product of at least one monomer selected from the group consisting of vinylaromatics, vinyl cyanides, C$_1$-C$_8$-alkyl (meth)acrylates, unsaturated carboxylic acids and derivatives of unsaturated carboxylic acids.

11. The molding composition according to claim 1 further containing at least one additive selected from the group consisting of stabilizers, pigments, demolding agents, flow aids, antistatic agents, fillers and reinforcing agents.

12. A molded article comprising the composition of claim 1.

* * * * *